United States Patent [19]

Roth et al.

[11] Patent Number: 4,720,783

[45] Date of Patent: Jan. 19, 1988

[54] PERIPHERAL BUS WITH CONTINUOUS REAL-TIME CONTROL

[75] Inventors: David A. Roth, Dousman; Eli BenArie, Fox Point, both of Wis.

[73] Assignee: General Electric Company, Schenectady, N.Y.

[21] Appl. No.: 295,354

[22] Filed: Aug. 24, 1981

[51] Int. Cl.⁴ .............................................. G06F 13/12

[52] U.S. Cl. .................................................... 364/200

[58] Field of Search ................ 340/721, 723; 364/167, 364/131, 200 MS File, 900 MS File; 358/10, 110-113, 139, 903; 378/901

[56] References Cited

U.S. PATENT DOCUMENTS

| | | | |
|---|---|---|---|
| T916,007 | 11/1973 | Bonner | 364/200 |
| 3,587,058 | 6/1971 | Butler et al. | 364/200 |
| 4,032,899 | 6/1977 | Jenny et al. | 364/200 |
| 4,070,710 | 1/1978 | Sukonick et al. | 364/200 X |
| 4,118,771 | 10/1978 | Pomella et al. | 364/200 X |
| 4,161,024 | 7/1979 | Joyce et al. | 364/200 |
| 4,161,784 | 7/1979 | Cushing et al. | 364/200 X |
| 4,181,939 | 1/1980 | Lyons | 364/200 |
| 4,245,244 | 1/1981 | Lijewski et al. | 378/901 X |
| 4,259,725 | 3/1981 | Andrews et al. | 364/521 |

*Primary Examiner*—Gary V. Harkcom
*Assistant Examiner*—David L. Clark
*Attorney, Agent, or Firm*—Fuller, Puerner & Hohenfeldt

[57] ABSTRACT

A digital data processing system wherein large amounts of digital data are transferred from a source that is coupled to the internal bus of a host CPU to a data receiving device by cooperation between the host CPU and a microprocessor. A multiplexer has one of its input ports coupled to the host bus and its output port coupled by way of what is called a non-real-time bus to one or more devices that may be destinations for large amounts of data and need to be under at least periodic or non-real-time control by the microprocessor. Another bus, called a real-time bus, couples the microprocessor to another input port of the multiplexer. All digital devices that require real-time control by the microprocessor are coupled to the real-time bus. For data transfer, the microprocessor causes the multiplexer to couple the host bus to the non-real-time bus at which time the processor suspends control over the non-real-time devices but maintains control over the devices coupled to the real-time bus.

1 Claim, 1 Drawing Figure

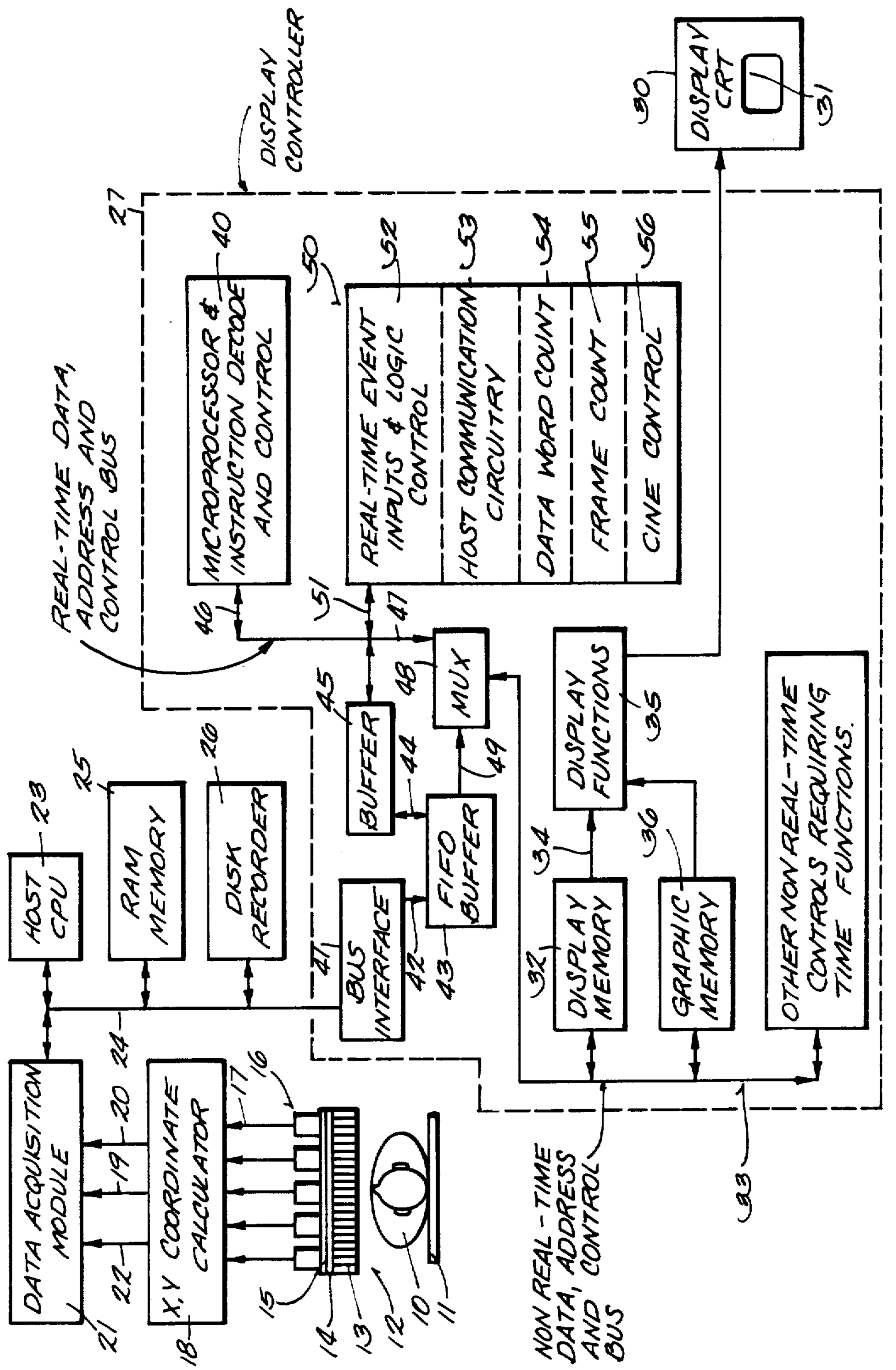
DISPLAY CONTROLLER
27
DISPLAY CRT
30
31
MICROPROCESSOR & INSTRUCTION DECODE AND CONTROL
40
50
REAL-TIME EVENT INPUTS & LOGIC CONTROL
52
HOST COMMUNICATION CIRCUITRY
53
DATA WORD COUNT
54
FRAME COUNT
55
CINE CONTROL
56
REAL-TIME DATA, ADDRESS AND CONTROL BUS
46
51
47
48
MUX
45
BUFFER
44
49
DISPLAY FUNCTIONS
35
OTHER NON REAL-TIME CONTROLS REQUIRING TIME FUNCTIONS.
HOST CPU
23
RAM MEMORY
25
DISK RECORDER
26
BUS INTERFACE
41
42
43
FIFO BUFFER
DISPLAY MEMORY
32
34
GRAPHIC MEMORY
36
DATA ACQUISITION MODULE
21
24
20
19
22
X,Y COORDINATE CALCULATOR
18
17
16
15
14
13
12
10
11
NON REAL-TIME DATA, ADDRESS AND CONTROL BUS
33

PERIPHERAL BUS WITH CONTINUOUS REAL-TIME CONTROL

BACKGROUND OF THE INVENTION

This invention pertains to a method and apparatus for allowing a large amount of digital data to be transferred over a bus without losing real-time control over peripheral devices during data transfer.

Every input-output card in a minicomputer system must communicate its control signal and its data transfers on a single host computer bus. In conventional systems, if large quantities of data must be transferred to a particular destination, data transfer blocks out the direct or real-time control of any peripheral device that is coupled to the bus during the time that the large block of data is being transferred.

One prior art method used to detect the status of and maintain control over devices subject to real-time control is to transfer small blocks of data with predefined open time intervals between blocks so that the computer can regain control over any peripheral device repeatedly during the open time intervals. Control action and status determination is usually not necessary at the predefined time intervals between all of the data blocks. Thus, intervals between data blocks become system dead time. In addition, this prior art method does not allow true real-time control over peripheral devices, requires counting and timing circuitry, and does not use the full bandwidth of the peripheral bus.

A second prior art method for direct data transfer that actually allows uninterrupted real-time control, requires use of two host bus interface circuits. One circuit communicates only with the control circuitry and the other with the direct transfer circuitry and the memory circuitry. This method not only requires two separate costly and space consuming bus structures but also requires twice as much host bus interface circuitry as the previously discussed prior art method. However, large quantities of data can be transferred continuously in blocks of any length. The control circuitry can also maintain control and status checking during data transfer and the peripheral bus can be used to its full bandwidth.

SUMMARY OF THE INVENTION

The invention described herein achieves the benefits of true real-time control of peripheral devices, full bandwidth transfers of data over a peripheral bus, and yet uses single host bus interface circuitry.

The invention is illustrated in a nuclear camera system wherein digital data representative of picture elements (pixels) in successive image frames is accumulated in a random access memory or a disk recorder, for example, and is then transferred to a display controller which effects display of the images on a cathode ray tube or television tube screen. By way of example, an image frame may be comprised of 256×256 pixels or data words of 12-bit length so the 65,536 digital words would have to be transferred for each image frame. During data transfer real-time processes are going on. For instance, a data word count must be kept in real-time while data is being transferred to the device that effects image display. The number of frames may have to be counted in real-time. Starting and terminating a cine camera that photographs the display is another typical real-time function involving devices whose control and status must be maintained during data transfer.

Various other functions such as communication between a local microprocessor in a display controller and the host computer or central processor unit (CPU) must be maintained.

In the system used to illustrate the invention, digital data for image frames is acquired from a nuclear camera system under the control of a host CPU and accumulated in a random access memory (RAM) or disk recorder and sent to the memory of a display controller at a selectable frame rate. The RAM and disk recorder are coupled to the host CPU bus and so is the display controller. A microprocessor governs the operational functions of the display controller in accordance with instructions received from the host CPU. The display controller has one input coupled to the host data, address and control bus. There are two bus paths divergent from the host bus in the display controller. One path leads to the microprocessor and to an input of a multiplexer. The other path leads to another input of the multiplexer. The bidirectional bus that couples the microprocessor to the multiplexer (MUX) has all of the devices that require real-time control and status checks coupled to it on the input side of the MUX. The output side of the MUX couples to a bus which connects to various devices that may be destinations for large blocks of data but do not require real-time control but only periodic control such as a display controller full-frame memory, a graphics data memory and other non-real-time controls which may require some time functions. Thus, the invention is distinguished by having all devices that require real-time control and status checks coupled to one input bus to the multiplexer and all devices that may require input of large blocks of data but require non-real-time or periodic control and status checks coupled to the output side of the MUX. Another input to the MUX is coupled to the host bus to permit long duration data transfers through the MUX to any of the devices which require periodic control. When large blocks of data are to be transferred, the microprocessor is instructed by the host CPU to set up or switch the MUX for transferring the digital image data from the host computer bus through the MUX to any device that is coupled to the MUX output such as the image display circuitry.

The manner in which the objects of the invention set forth above and other more specific objects are achieved will be evident in the more detailed description of an illustrative embodiment of the invention which will now be set forth in reference to the drawing.

DESCRIPTION OF THE DRAWING

The drawing depicts a block diagram of a nuclear camera system and its data acquisition system in conjunction with a display controller that effects display of images on a cathode ray tube or television screen.

DESCRIPTION OF A PREFERRED EMBODIMENT

In the drawing, a typical source of digital data is a camera system which is used in nuclear medicine and is schematized in the left region of the drawing. Here a patient 10 is supported on a table top 11. An organ of the patient is assumed to be infused with a radioisotope that emits gamma ray photons in a pattern that reveals the configuration and other characteristics of the organ.

The nuclear camera is designated generally by the reference numeral 12. Its basic elements are a collimator 13 that is typicallly a lead plate in which there are a plurality of parallel holes for transmitting gamma ray photons that are coaxial with the holes. A large crystal 14 interfaces with the collimator and produces a scintillation event wherever a gamma ray photon is absorbed. A glass plate 15 effects an optical coupling between scintillation crystal 14 and an array of photomultiplier tube detectors 16. Typically there may be 37 such tubes closely packed within a circle. Each tube responds to each scintillation by producing analog signals which are output on individual conductors such as the one marked 17. The analog signals associated with each scintillation event are fed to a calculator circuit, symbolized by the block marked 18. This circuit calculates the x and y coordinates of each scintillation event and produces analog signals that correspond to the coordinates. The x and y coordinate signals are output on lines 19 and 20 to a data acquisition module represented by the block marked 21. Another output 22 from the calculator provides what is typically called a z signal that is indicative of whether or not the scintillation event whose coordinates have been calculated is in an energy range that permits it to be considered a valid event.

Besides doing other things, data acquisition module 21 converts the analog x,y coordinate signals to digital signals or words which respectively correspond to the x,y coordinates of the scintillation events. A host CPU is provided and is represented by the block marked 23. It may perform some functions which are not relevant to the present invention. The CPU is connected to a bidirectional data, address and control bus marked 24 that is referred to herein as the host bus. To exemplify one function of host CPU 23, it controls the data acquisition module 21 to count the number of events at each x,y coordinate. A random access memory (RAM) represented by the block marked 25 is also coupled to bus 24. In this particular embodiment, each time a scintillation event is counted at a particular coordinate, a corresponding location in the RAM 25 is incremented. Thus, the digital words or values stored in the respective locations of the RAM represent the intensity or brightness of the corresponding location in the body from which the gamma ray photons have emanated. Thus, RAM 25 stores digital numbers in respective locations that are representative of the intensities of the picture elements (pixels) that define the image. Typically there are 256×256 pixel or RAM locations each of which has a depth of 12 bits. Regardless of the length of an exposure interval, and assuming full-frame acquisition, there will be a need for transferring up to 65,536 12-bit words comprising an image to the image display system for each image frame in a sequence. A magnetic disk recorder is also coupled to the main host CPU bus 24 and is represented by the block marked 26. In some cases, frame data may be accumulated on magnetic disk. Thus, image frame data may be fed from bus 25 to RAM 25 and disk recorder 26 and from RAM 25 and disk recorder 26 to bus 24 for transfer to the display controller which is contained within the dashed line rectangle marked 27.

The nuclear camera system thus far described is described in greater detail in co-pending application Ser. No. 280,714, filed July 1, 1981, which is assigned to the assignee of this application.

The ultimate objective of the system is, of course, to display images of body organs on a television monitor or display cathode ray tube (CRT) such as the one symbolized by the block marked 30. Various display modes are available with the system. For instance, the system may be operated in the cine mode in which case image frames are displayed in rapid sequence so that motion of the organ from frame-to-frame or advancement of radioisotope-infused blook in the blood vessels can be visualized on the display screen 31 of the television monitor. Image data may also be recorded on magnetic disk in recorder 26 for a sequence of views resulting from orbiting the nuclear camera 12 around the body in which case the digital pixel data are transferred on a frame-by-frame basis for the various angles of the camera such that the visual effect created is that of rotating the organ. In any case, it will be evident that a lot of digital data will have to be transferred with substantially no interruption from RAM or disk memory in order to achieve the desired visual effects. Moreover, as those skilled in the nuclear camera and display art will realize, the various modes will require such functions as counting the number of data words transferred from memory to demark the beginning and end of the data that constitutes a frame. For certain modes of operation, counting the number of frames is also required. The cine mode, for instance, requires presenting frames at a selected rate. These latter functions are typical of those which must be monitored or controlled in real-time without limiting or interrupting the data transfer rate in the display controller. How this is accomplished, in accordance with the invention, will now be discussed.

Display controller 27 has a full-frame memory that is symbolized by the block marked 32. In this particular example, display memory 32 has the capacity for storing the typical 65,536 digital words or pixels constituting an image frame. Display memory 32 is coupled to what is designated herein as a non-real-time data, address and control bus 33. The output 34 of display memory 32 is input to a block 35 which performs certain processes or functions in connection with image display such as converting the digital data output from memory 32 to analog video signals for synchronizing and driving television display 30. Other typical functions on the output side of the display memory are exemplified in the earlier cited co-pending patent application. A block marked with the legend "graphic memory" and the reference numeral 36 is also typical of a device that is coupled to non-real-time bus 33 and which does not require uninterrupted or real-time control and status checking. The input to graphic memory 36 may be data for enabling display of alpha numeric information on display screen 31, for example. The graphic memory may also be provided with data for permitting display of cursor lines on the display screen or a grid, by way of example, for permitting particular areas on the display screen to be specified. There is no need to provide for changing the data in the graphic memory while frame data are being transferred to the display memory 32 so full real-time control and status checking of the graphic memory is not required. Although the graphic memory provides one example of a device that does not require constant real-time control and checking during image data transfer, other such devices in this and any given system may also not require real-time control. These devices and functions are represented collectively by the block marked 37 and containing a legend that it represents other non-real-time controls and may be exercised when time is available that does not interfere with rapid transfer of large blocks of digital data.

Display controller 27 includes a microprocessor and its associated instruction decoding and control circuits and the customary RAM and ROM devices which are designated collectively by the block marked 40. Microprocessor system 40 performs all of the control and data directing functions that are incidental to operation of a display controller 27.

The input from host CPU bus 24 to display controller 27 is by means of a bus interface that is represented by the block marked 41 which performs the usual functions of obtaining bus-to-bus isolation and accounts for any differences which may exist in the time relationships between a data source bus and a bus which leads to data utilizing services. The output bus 42 of the interface couples to an input of a buffer 43 which is of the first-in and first-out (FIFO) type in this data handling circuit example. Buffer 43 has two output paths or bus routes. One route is a bidirectional bus 44 which couples to an optionally used buffer 45. Buffer 45 is coupled to microprocessor system 40 by way of a bidirectional bus 46. The latter is also in a circuit with a bus 47 which is designated herein as a real-time data, address and control bus. Bus 47 is one input to a multiplexer (MUX) that is symbolized by the block marked 48. The other route leading from buffer 43 is constituted by a bus 49 that is another input to MUX 48. The route including bus 44, buffer 45 and bus 46 between FIFO buffer 43 and microprocessor unit 40 provide for bidirectional communication between host CPU 23 and its bus 24 and microprocessor unit 40. Bus 49 from FIFO buffer 43 is coupled to one input port of MUX 48 and is used to transfer the large blocks of digital data from host CPU bus 24 through MUX 48 to various devices that require periodic but not real-time control by the microprocessor such as display memory 32 and graphic memory 36.

The real-time data, address and control bus 47 has a number of devices coupled to it and these are represented collectively by the block marked 50. Bus 47 also couples microprocessor 40 to a second input port of MUX 48. A bidirectional bus 51 symbolizes making the connections between the various devices in block 50 and real-time bus 47. All of the devices in block 50 have real-time event inputs and logic control which is only represented once by the subdivided block 52. All of the devices in block 50 are the type that should be subject to status checks and control in real-time and at any time even though transfer of a continuous stream of digital data to the display memory 32 may be in progress. The legends in some of the other subdivisions of block 50 such as host communication circuitry 53, data word count circuitry 54, frame count circuitry 55 and cine control circuitry 56 are typical of functions in this system that should desirably be subject to real-time control and status checking.

To illustrate operation of the system, assume that one or a sequence of large blocks of digital image frame data are to be transferred from RAM memory 25 or magnetic disk recorder 26 to display memory 32 for permitting display of one or a sequence of images on television monitor screen 31. The first thing to happen would be for the host CPU 23 to instruct the microprocessor unit 40 that a large block of data is to be transferred through MUX 48 to display memory 32, for instance. The microprocessor 40, being able to control MUX 48 by way of bus 47, then causes input bus 49 to the MUX and in effect, the host bus 24 to be coupled to the output port of the MUX for transferring data through the MUX to display memory 32 by way of non-real-time bus 33. When the input port of bus 49 of MUX 48 is switched or coupled to the output port bus 33 of the MUX, the microprocessor sends a coded message through buffer 45, buffer 43, bus interface 41 to the host CPU bus 24 to inform the host CPU that the system is set up to permit transfer of the digital frame data from a data source such as memory 25. The host CPU 23 then permits the data to be supplied from memory through MUX 48 to the proper destinations that have been addressed by the microprocessor such as to the display memory 32. Meanwhile, the devices in block 50 which must be subject to real-time control and status checking remain coupled to real-time data, address and control bus 47 such that the microprocessor unit 40 can constantly control and check the status of the various devices in block 50 on a real-time basis even though transfer of large amounts of pixel or digital frame data is in progress for a substantial period of time.

When data transfer is complete, the host CPU must deliver an instruction through FIFO buffer 43 to the microprocessor unit 40 that data transfer is completed. This is achieved by having the host CPU indicate the number of data words it is going to transfer such that the microprocessor unit can set up the data word counter 54 to determine the count and inform the microprocessor that it can switch the MUX to effect coupling real-time bus 47 to non-real-time bus 33 again. Then microprocessor unit 40 can begin to do such things as set up the graphic memory 36 to receive data if the microprocessor is instructed by the host CPU that it wants to send graphic data.

In summary, the invention involves determining which devices in a data processing and transfer system require real-time control and which devices do not and inserting a multiplexer between those devices.

Although the invention has been described in relation to a nuclear camera system, such description is intended to be illustrative rather than limiting, for the invention may be variously used and is to be limited only by interpretation of the claims which follow.

We claim:

1. A system for maintaining uninterrupted or real-time control and status checking of digital devices that require said control and checking while digital data are being transferred to other digital devices that require only periodic control and checking, comprising:

host processor means and host bus means coupled thereto, digital data source means coupled to said host bus means, a multiplexer having first and second input ports and an output port, means for coupling said first input port to said host bus means, said multiplexer responding to commands by coupling and uncoupling said first input port and alternately uncoupling and coupling said second input port and said output port, control processor means and means for coupling said control processor means to said host bus means for enabling intercommunication between said host processor means and said control processor means and control bus means for coupling said control processor means to said second input port of the multiplexer, a plurality of digital devices that are designated real-time devices and are coupled to said control bus, a plurality of digital devices that are designated as non-real-time devices and are coupled to said output port of said multiplexer, said control processor means responding to a command from said host processor by providing one type of command to which said multiplexer responds by maintaining the coupling between said control bus on said second input port of said multiplexer and said output port and responsive to another command for said host processor by providing another type of command to which said multiplexer responds by uncoupling said control bus on said second input port from said output port of the multiplexer, said control processor means thereby being able to communicate with and control said real-time devices continuously by way of said control bus and to also commmunicate with said non-real-time devices when said second input port of said multiplexer is coupled to the output port of said multiplexer in response to a command by said control processor means, and said control processor means thereby being able to continue to communicate with and control said realtime devices by way of said control bus when said multiplexer has been commanded to couple said first input of the multiplexer, to which said host bus is coupled, to the output of the multiplexer for transferring said digital data from said data source to said non-real-time devices.

* * * * *